US007010263B1

(12) United States Patent
Patsiokas

(10) Patent No.: US 7,010,263 B1
(45) Date of Patent: Mar. 7, 2006

(54) SYSTEM AND METHOD FOR DISTRIBUTING MUSIC AND DATA

(75) Inventor: Stellios J. Patsiokas, Plantation, FL (US)

(73) Assignee: XM Satellite Radio, Inc., Washington, DC (US)

(*) Notice: Subject to any disclaimer, the term of this patent is extended or adjusted under 35 U.S.C. 154(b) by 0 days.

(21) Appl. No.: 09/461,699

(22) Filed: Dec. 14, 1999

(51) Int. Cl.
*H04H 1/00* (2006.01)

(52) U.S. Cl. ................. 455/3.02; 455/3.06; 455/186.1; 455/3.03; 455/3.04; 709/219; 709/231; 709/203; 725/68; 725/70; 725/113; 725/116; 725/134

(58) Field of Classification Search ............... 455/3.02, 455/3.03, 3.06, 3.04, 186.1, 68, 69; 725/68, 725/70, 109, 110, 111, 112, 113, 134
See application file for complete search history.

(56) References Cited

U.S. PATENT DOCUMENTS

| | | | | |
|---|---|---|---|---|
| 5,051,822 A | * | 9/1991 | Rhodes | 358/86 |
| 5,393,965 A | * | 2/1995 | Bravman et al. | 235/383 |
| 5,564,001 A | * | 10/1996 | Lewis | 395/154 |
| 5,592,511 A | * | 1/1997 | Schoen et al. | 375/220 |
| 5,654,746 A | * | 8/1997 | McMullan, Jr. et al. | 348/6 |
| 5,857,156 A | * | 1/1999 | Anderson | 455/517 |
| 5,915,020 A | * | 6/1999 | Tilford et al. | 380/10 |
| 5,990,884 A | * | 11/1999 | Douma et al. | 345/327 |
| 6,075,568 A | * | 6/2000 | Matsuura | 348/478 |
| 6,205,485 B1 | * | 3/2001 | Kikinis | 709/231 |
| 6,272,312 B1 | * | 8/2001 | Takayama et al. | 455/3.02 |
| 6,314,577 B1 | * | 11/2001 | Pocock | 725/93 |

* cited by examiner

*Primary Examiner*—Marceau Milord
(74) *Attorney, Agent, or Firm*—Benman, Brown & Williams

(57) ABSTRACT

A system and method for distributing music and data. The music or data is first transmitted to a consumer via a satellite radio network. The system includes a satellite radio receiver for the user which is capable of receiving the wireless transmission and providing an audio and/or visual output in response thereto. In addition, the receiver is adapted to receive an input (e.g., voice command) from the user by which the user is able to signal an interest in recording a selection of music or data being played and/or displayed. In response to this signal and a record-ability signal, an ID signal is stored on a removable media which identifies the selection being played and/or displayed. The ID signal may be a composite signal indicating the time and channel, a signal that identifies a selection by number, or other suitable ID signal. Finally, the system includes a computer for allowing the user to use the removable media to retrieve the desired selection via the a second network such as private distribution hub or the World Wide Web. In the specific illustrative embodiment, the removable media is electronic (flash) memory. The web site is implemented with software running on a server which translates the ID signal into a human readable identification (e.g., title and artist) of the music or data selected. The user then either downloads the desired selection through the web site or places an order for delivery of physical media (e.g., a CD) on which the desired selection is stored.

16 Claims, 8 Drawing Sheets

SYSTEM AND METHOD FOR DISTRIBUTING MUSIC AND DATA

BACKGROUND OF THE INVENTION

1. Field of the Invention

The present invention relates to communications systems. More specifically, the present invention relates to systems and methods for distributing, broadcasting, and recording music information and other content.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Music and information are currently widely disseminated through two primary methodologies: 1) broadcast channels (e.g., radio and television) and 2) distribution of physical storage media (books, tapes, CDs, etc.). While broadcast channels offer a rich variety of content along with freedom of motion, the user does not have program control over the content being broadcast. Further, there is no permanent storage of the content being broadcast without the use of a storage device and, such recording, may be illegal. Accordingly, it is common practice to maintain a library of physical storage media (e.g., CDs) allowing for a use or enjoyment of the content stored therein at a time of the user's choosing.

The distribution of physical storage media (books, tapes, records, CDs, etc.) is currently a costly process. Music distribution, for example, begins with the storage of the music on a master disk from which copies are made for distribution. The copies are stored on CDs, tapes or other conventional music storage medium. Each copy is labeled and placed in a package. The packages are typically pre-printed in full-color to provide information with respect to the artist, the title of the work, the content of work, the name of the distributor, etc. In addition, the packaging is often designed artistically in a way that is consistent with the genre of the selection and to attract the attention of consumers. All of these features add to the considerable cost associated with the conventional method for distributing music.

Hence, a need exists in the art for an inexpensive system or method for distributing music, information and other content on physical storage media per the desires of the end user in a legal manner that does not violate the rights of the content providers and/or artists.

SUMMARY OF THE INVENTION

The need in the art is addressed by the system and method for distributing music and data of the present invention. In accordance with the invention, the music or data is first transmitted to a consumer via a wireless network. In the specific illustrative embodiment, the wireless network is a satellite and terrestrial radio network. The user is provided with a receiver which is capable of receiving the wireless transmission and providing an audio and/or visual output in response thereto. In addition, the receiver is adapted to receive an input from the user by which the user is able to signal an interest in purchasing a selection of music or data being played and/or displayed. (In the best mode, a voice recognition system is included to provide for receipt of the user's input.)

In the illustrative embodiment, in response to this signal from the user and a record-ability flag transmitted in response to input from a content provider, an ID signal is stored on a removable media which identifies the selection being played and/or displayed. In the specific illustrative embodiment, the removable media is electronic (flash) memory. The ID signal may be a composite signal indicating the time and channel, a signal that identifies a selection by number, or other suitable ID signal. The receiver or the user's home computer may be used to display the title, artist and/or other information based on the user's selections.

The system includes a mechanism for allowing the user to retrieve the desired selection from a second network using the removable media. Several alternatives are provided for the retrieval mechanism. In one embodiment, the retrieval mechanism is a computer, located either in the user's home or in a commercial establishment, through which the user is allowed to access a web site on the World Wide Web or a site on a private distribution hub. In either case, the site provides interface software which translates the ID signal into a human readable identification (e.g., title and artist) of the music or data selected. In an alternative embodiment, the computer is provided in a kiosk accessible to the public.

The user then either downloads the desired selection through the site or places an order for delivery of physical media (e.g., a CD) on which the desired selection is stored.

DESCRIPTION OF THE INVENTION

Figure 1:
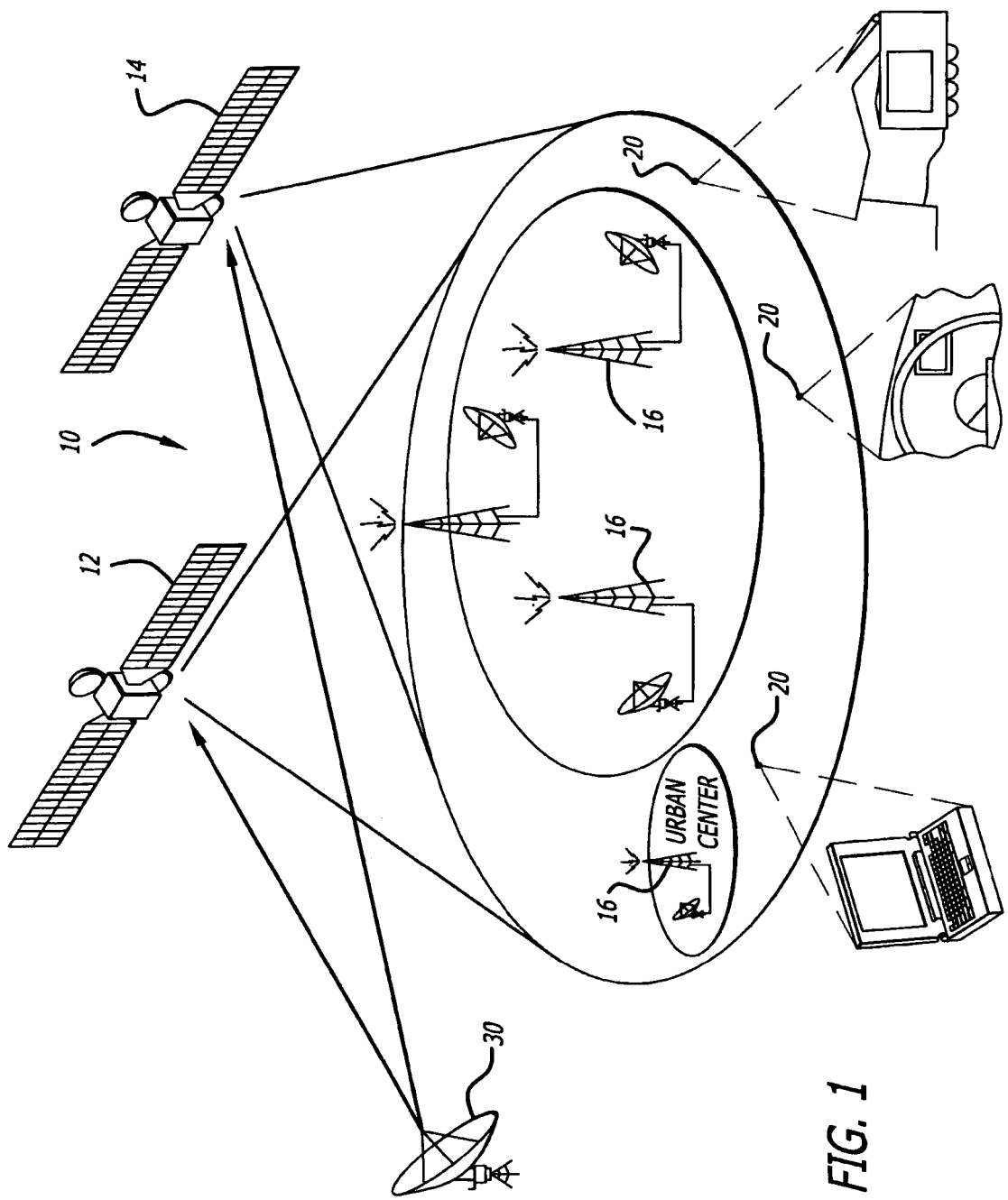
FIG. 1 is an illustrative implementation of a satellite digital audio service system architecture.

Illustrative embodiments and exemplary applications will now be described with reference to the accompanying drawings to disclose the advantageous teachings of the present invention.

Satellite radio operators will soon provide digital quality radio broadcast services covering the entire continental United States. These services will offer approximately 100 channels, of which nearly 50 channels will provide music with the remaining stations offering news, sports, talk and data channels.

Satellite radio has the ability to improve terrestrial radio's potential by offering a better audio quality, greater coverage and fewer commercials. Accordingly, in October of 1997, the Federal Communications Commission (FCC) granted two national satellite radio broadcast licenses. The FCC allocated 25 megahertz (MHz) of the electromagnetic spectrum for satellite digital broadcasting, 12.5 MHz of which are owned by Sirius Satellite Radio and 12.5 MHz of which are owned by the assignee of the present application "XM Satellite Radio Inc.".

The system plan for each licensee presently includes transmission of substantially the same program content from two or more geosynchronous or geostationary satellites to both mobile and fixed receivers on the ground. In urban canyons and other high population density areas with limited line-of-sight (LOS) satellite coverage, terrestrial repeaters will broadcast the same program content in order to improve coverage reliability. Some mobile receivers will be capable of simultaneously receiving signals from two satellites and one terrestrial repeater for combined spatial, frequency and time diversity, which provides significant mitigation of multipath interference and addresses reception issues associated with blockage of the satellite signals. In accordance with XM Radio's unique scheme, the 12.5 MHz band will be split into 6 slots. Four slots will be used for satellite transmission. The remaining two slots will be used for terrestrial re-enforcement.

In accordance with the XM frequency plan, each of two geostationary Hughes 702 satellites will transmit identical or at least similar program content. The signals transmitted with QPSK modulation from each satellite (hereinafter satellite1 and satellite2) will be time interleaved to lower the short-term time correlation and to maximize the robustness of the signal. For reliable reception, the LOS signals transmitted from satellite1 are received, reformatted to Multi-Carrier Modulation (MCM) and rebroadcast by terrestrial repeaters. The assigned 12.5 MHz bandwidth (hereinafter the "XM" band) is partitioned into two equal ensembles or program groups A and B. The use of two ensembles allows 4096 Mbits/s of total user data to be distributed across the available bandwidth. Each ensemble will be transmitted by each satellite on a separate radio frequency (RF) carrier. Each RF carrier supports up to 50 channels of music or data in Time Division Multiplex (TDM) format. With terrestrial repeaters transmitting an A and a B signal, six total slots are provided, each slot being centered at a different RF carrier frequency.

In accordance with the present invention, satellite radio is utilized along with a removable storage medium and the World Wide Web or a centralized distribution hub to provide a novel and advantageous system and method for distributing music, information, and other content within legal means.

Figure 2:
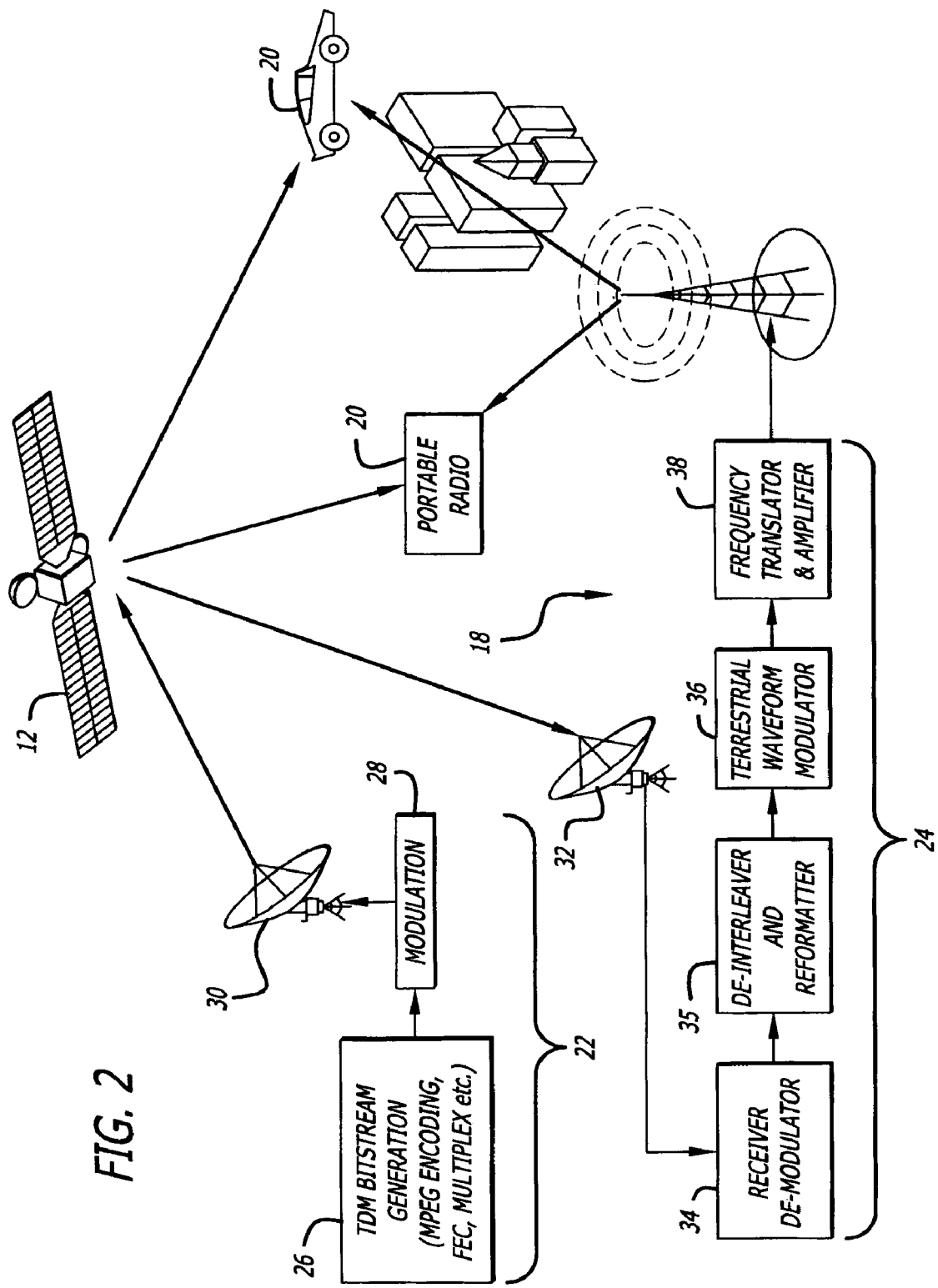
FIG. 2 is a diagram which illustrates the system of FIG. 1 in greater detail.

An illustrative implementation of satellite digital audio service (SDARS) system architecture is depicted in FIGS. 1 and 2. As illustrated in FIG. 1, the system 10 includes first and second geostationary satellites 12 and 14 which transmit line-of-sight (LOS) signals to SDARS receivers located on the surface of the earth. The satellites provide for interleaving and spatial diversity. The system 10 further includes multiple terrestrial repeaters 16 which receive and retransmit the satellite signals to facilitate reliable reception in geographic areas where LOS reception from the satellites is obscured by tall buildings, hills, tunnels and other obstructions. The signals transmitted by the satellites 12 and 14 and the repeaters 16 are received by SDARS receivers 20. As depicted in FIG. 1, the receivers 20 may be located in automobiles, handheld or stationary units for home or office use. The SDARS receivers 20 are designed to receive one or both of the satellite signals and the signals from the terrestrial repeaters and combine or select one of the signals as the receiver output as discussed more fully below.

FIG. 2 is a diagram which illustrates the system 10 of FIG. 1 in greater detail with a single satellite and a single terrestrial repeater. FIG. 2 shows a broadcast segment 22 and a terrestrial repeater segment 24. In the illustrative embodiment, an incoming bit stream is encoded into a time division multiplexed (TDM) signal using an audio compression scheme (such as MPEG or Lucent's PAC) by an encoder 26 of conventional design. The TDM bit stream is upconverted to RF by a conventional quadrature phase-shift keyed (QPSK) modulator 28. The upconverted TDM bit stream is then uplinked to the satellites 12 and 14 by an antenna 30. Those skilled in the art will appreciate that the present invention is not limited to the broadcast segment shown. Other systems may be used to provide signals to the satellites without departing from the scope of the present teachings.

The satellites 12 and 14 act as bent pipes. The satellites translate the frequency of the uplinked signal and retransmit the signal to terrestrial repeaters 18 and portable/mobile receivers 20. As illustrated in FIG. 2, the terrestrial repeater includes a receiver demodulator 34, a de-interleaver and reformatter 35, a terrestrial waveform modulator 36 and a frequency translator and amplifier 38. The receiver and demodulator 34 down-converts the downlinked signal to a TDM bitstream. The de-interleaver and reformatter 35 re-orders the TDM bitstream for the terrestrial waveform. The digital baseband signal is then applied to a terrestrial waveform modulator 36 (e.g. MCM or multiple carrier modulator) and then frequency translated to a carrier frequency prior to transmission.

Figure 3:
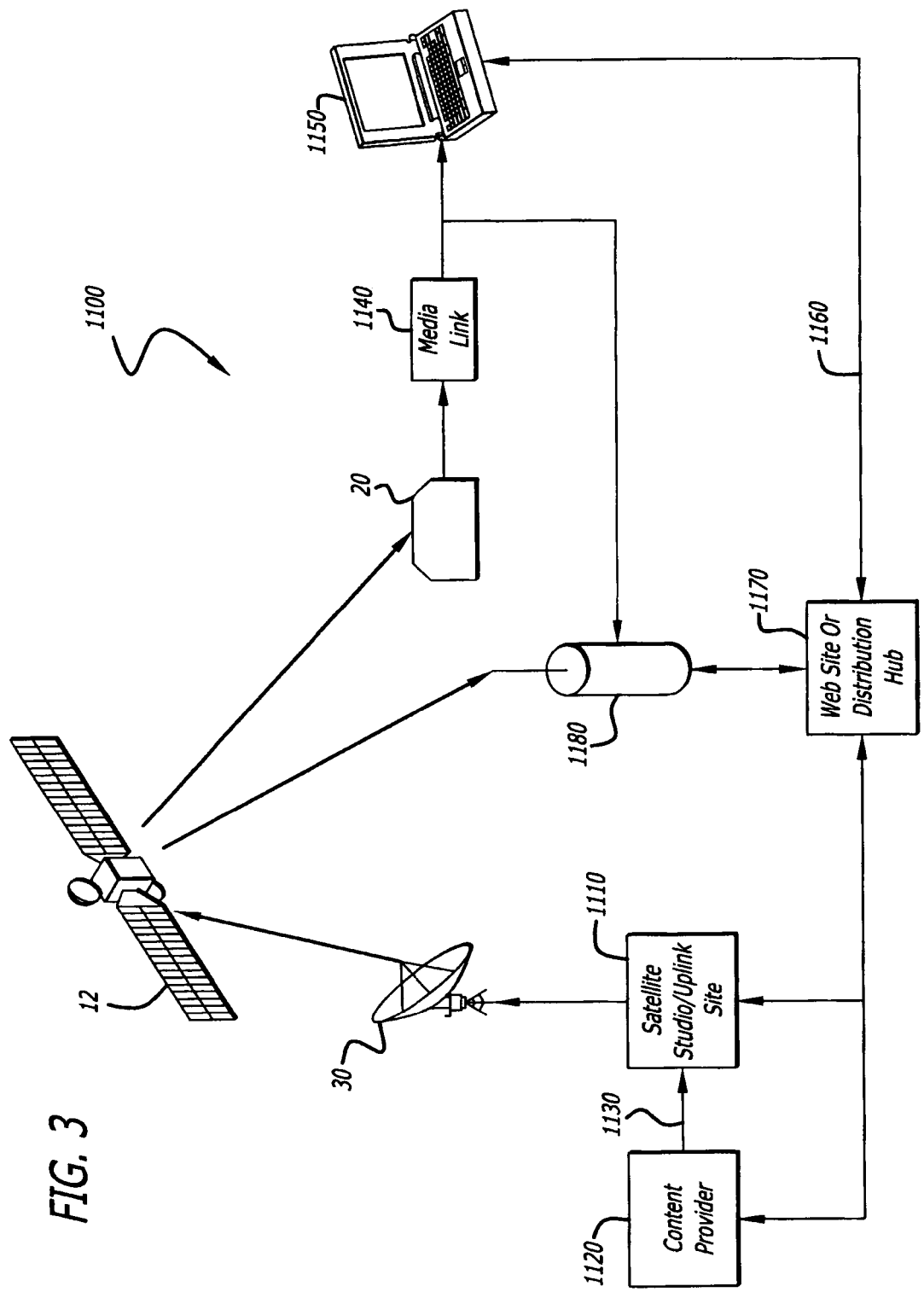
FIG. 3 is a high-level diagram showing the system for distributing music and data of the present invention.

FIG. 3 is a high-level diagram showing the system for distributing music and data of the present invention. The system 1100 includes a studio/uplink site 1110 that receives content (e.g., music) from a content provider 1120 via a feeder link 1130. As will be appreciated by those skilled in the art, the content may be provided electronically or on a physical storage medium such as a compact disc. As discussed more fully below, the studio/uplink site 1110 digitally encodes the selections of music and/or information provided by the content provider 1120 and applies a header that includes a selection ID (identifier).

The encoded bitstream along with the header are uplinked from the studio/uplink site 1110 to the satellite 12 via the antenna 30. As mentioned above, the satellite 12 acts as a bent pipe with a frequency translation (e.g. from X band to S band) and retransmits the received signal to a portable/mobile satellite radio receiver 20.

The receiver 20 plays a plurality of selections received on the channels selected by the user. In addition, the receiver 20 has a user interface (not shown) which allows it to receive input from a user indicating a desire to record a given selection. Those skilled in the art will appreciate that the present invention is not limited to the mode or manner by which the user input is provided. The user input may be provided via a record button, voice recognition system, or other suitable means.

In accordance with the present teachings, on receipt of the record signal from the user, the receiver 20 checks for a recordability flag provided by a content provider and transmitted with the uplink signal, and if the flag permits, the receiver retrieves the identifying (ID) code pertaining to a selection currently being played or displayed and stores the code, in the best mode, on a removable media 1140 such as a flash memory card. (Those skilled in the art will appreciate that the use of the record-ability flag prohibits illegal recording of the selections being broadcast.) The removable media 1140 acts as a link between the receiver 20 and a separate computer 1150. The receiver is adapted to store the user's selections and display the selections to the user.

In accordance with the present teachings, when the user desires to receive his or her selections, the user removes the flash card 1140 from the receiver 20 and inserts the card 1140 into a suitable reader (not shown) connected to the computer 1150. The computer 1150 is equipped with a modem by which the user is able to access a second network 1160 and thereby achieve a connection to a web site or private distribution hub 1170 designed and configured in accordance with the present teachings. In a home implementation of the invention, the removable storage media 1140 is used with a reader which is directly connected to the computer in the case where the receiver is portable or stationary unit independent of a vehicle.

As yet another alternative, as illustrated in FIG. 3, the user may take the removable media 1140 to a computer in a publicly accessible kiosk 1180 or a commercial establishment and order the selection in the manner described above.

The site or hub 1170 provides the user with a software interface which reads the ID from the media 1140 and, in the best mode, displays information relating to the desired selection for the user's perusal. In the case of music for example the information might include the name of the artist in the title of the selection. This information is provided to a server hosting web site (not shown) by the studio/uplink site 1110. As an alternative, the song ID, the song title and/or the artist may be transmitted to the receiver and displayed either at the receiver at the request of the end user, or on the user's computer.

The user is given the option to order the selection and if he or she does so, the selection is delivered to the user either in real time in a digital format, e.g., MPEG 3 format, with a very high-quality bit rate via the web site 1170, or by a postal service, a courier, or other suitable means.

Figure 4:
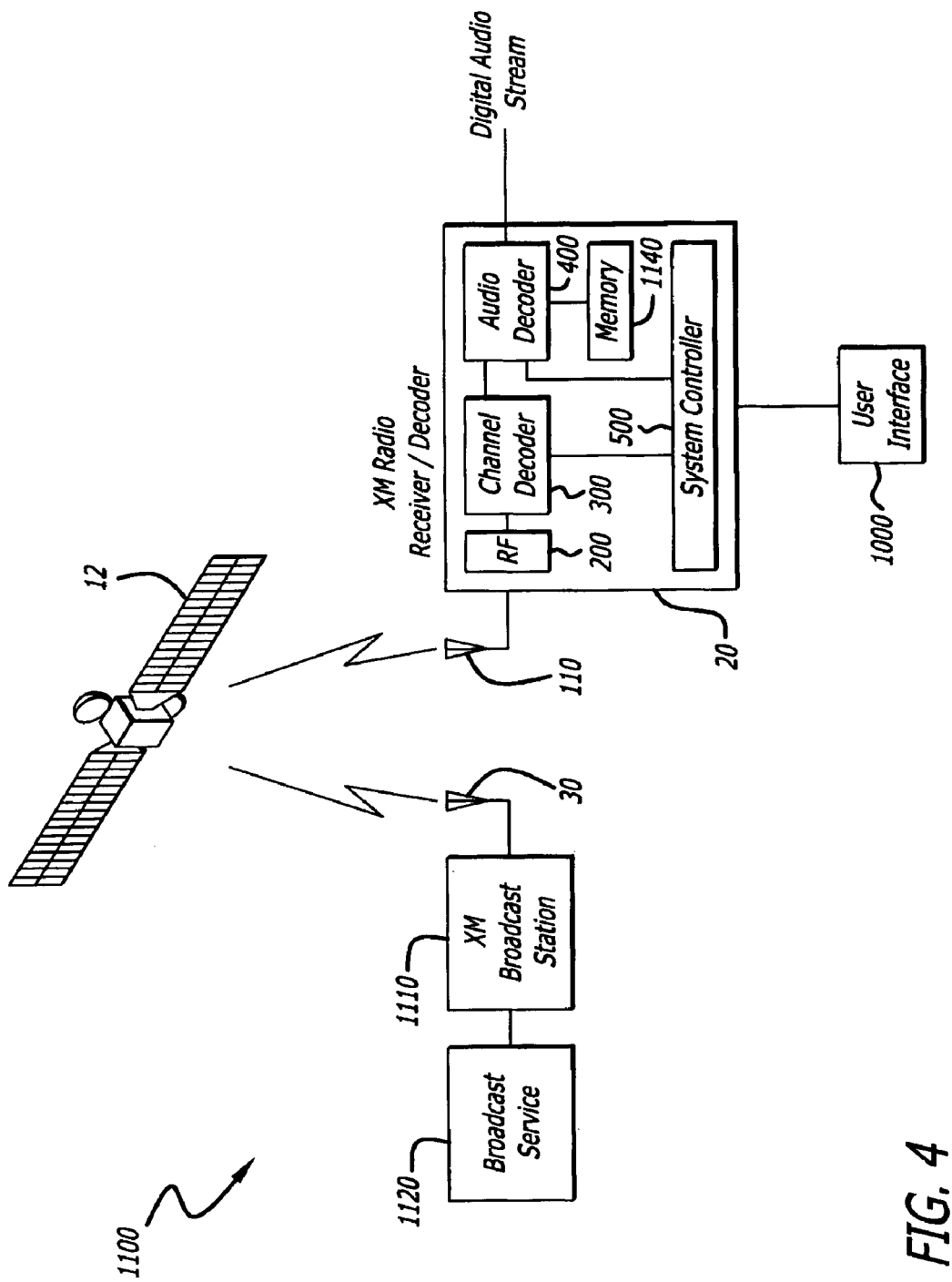
FIG. 4 is a simplified high-level diagram of the system for distributing music and data of the present invention showing the satellite radio receiver in more detail.

FIG. 4 is a simplified high-level diagram of the system for distributing music and data of the present invention showing the satellite radio receiver in more detail. In the preferred embodiment, the receiver 20 is an XM satellite receiver such as that disclosed and claimed in copending U.S. patent applications entitled LOW COST INTEROPERABLE SATELLITE DIGITAL AUDIO RADIO SERVICE (SDARS) RECEIVER ARCHITECTURE, filed May 25, 1999 by P. Marko et al., Ser. No. 09/318,296, and SATELLITE DIGITAL AUDIO RADIO SERVICE RECEIVER ARCHITECTURE FOR RECEPTION OF SATELLITE AND TERRESTRIAL SIGNALS, filed Nov. 4, 1999 by P. Marko et al., Ser. No. 09/435,317, the teachings of both of which are hereby incorporated herein by reference.

As shown in FIG. 4, the receiver 20 includes an antenna module 110, an RF tuner module 200, a channel decoder 300, an audio decoder 400, system controller 500, and a user interface 1000. In accordance with the present teachings, the receiver further includes the removable media 1140.

Figure 5A:
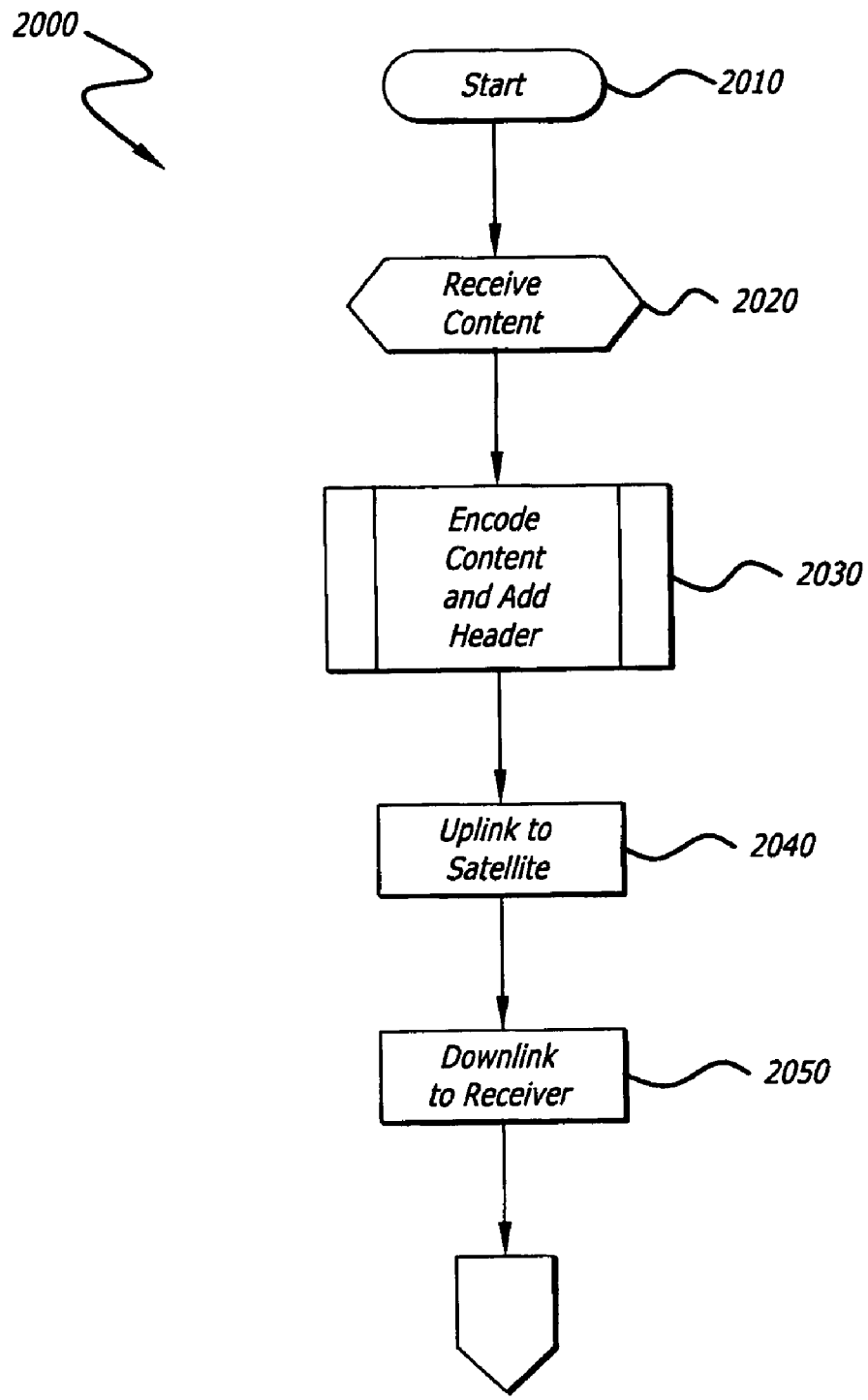
FIG. 5 is a flowchart which illustrates the method of the present invention.
Figure 5B:
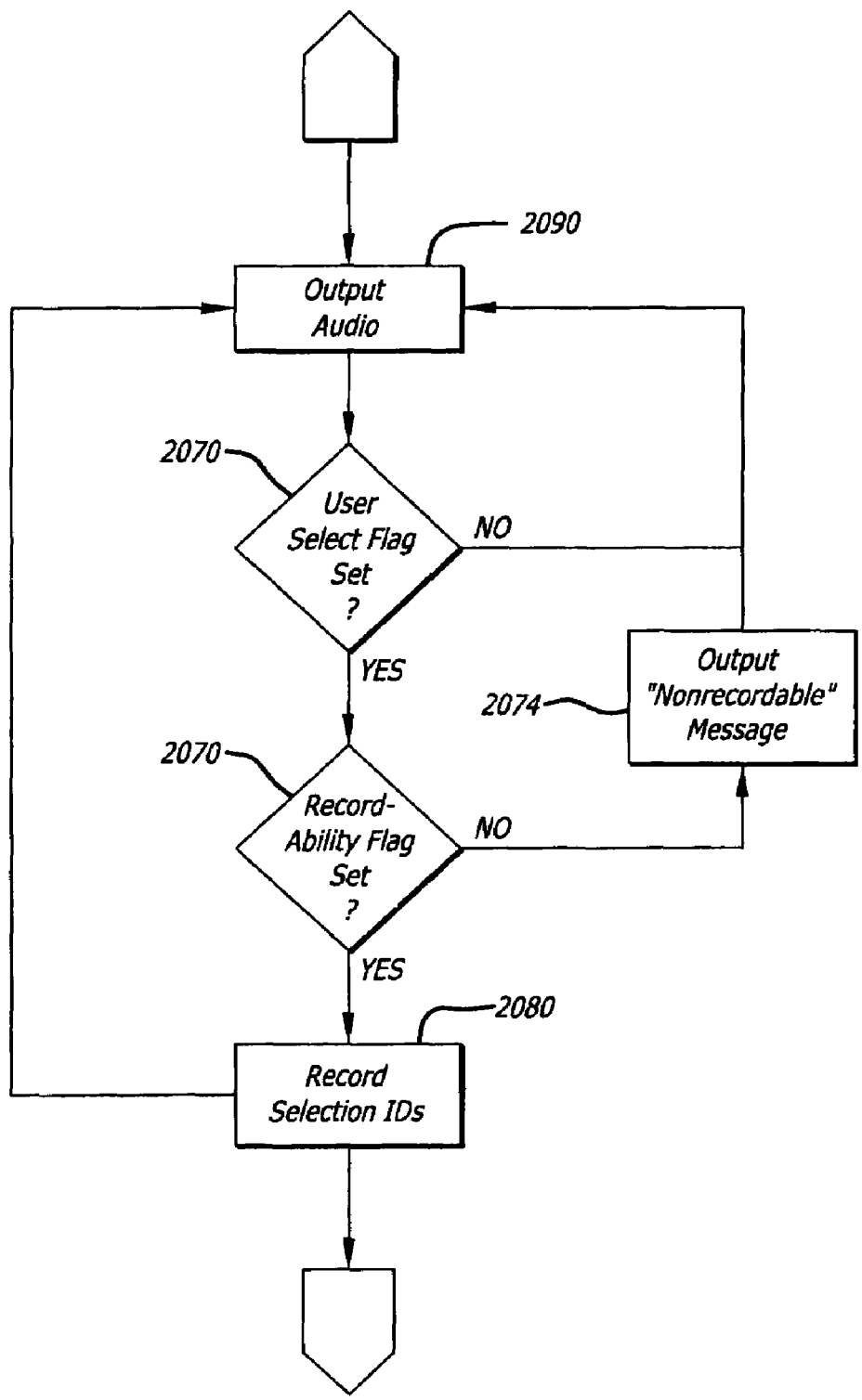
Figure 5C:
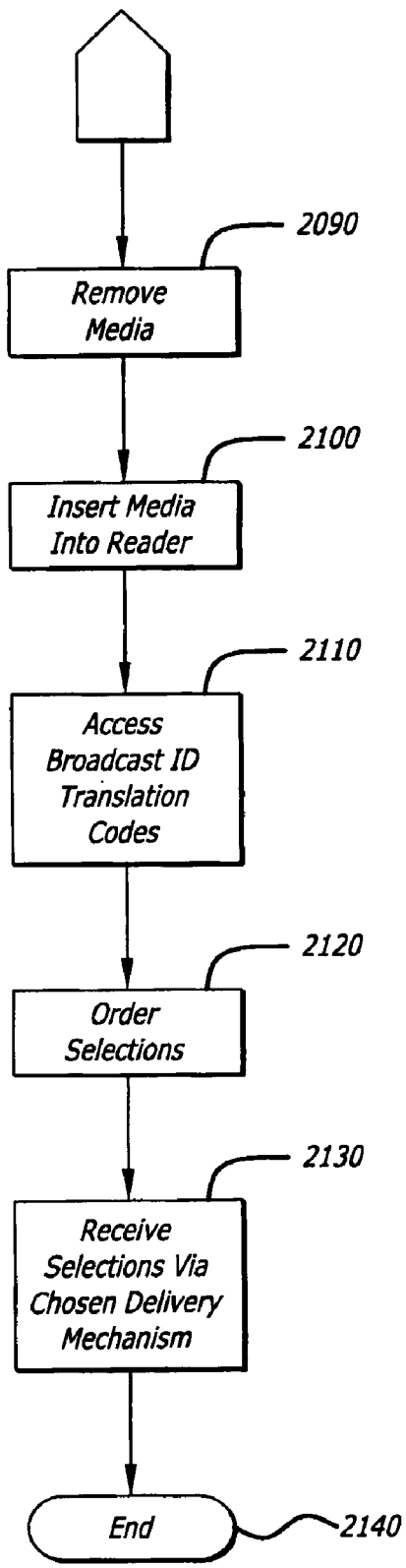

FIG. 5 is a flowchart that illustrates the method of the present invention. As depicted in the flow diagram 2000 of FIG. 5, after the system 1100 is initialized at step 2010, the studio/uplink site 1110 receives content from the content provider 1120 at step 2020. At step 2030, the station 1110 digitizes and encodes the content in the manner described in the above-referenced patents and adds a header thereto.

Figure 6:
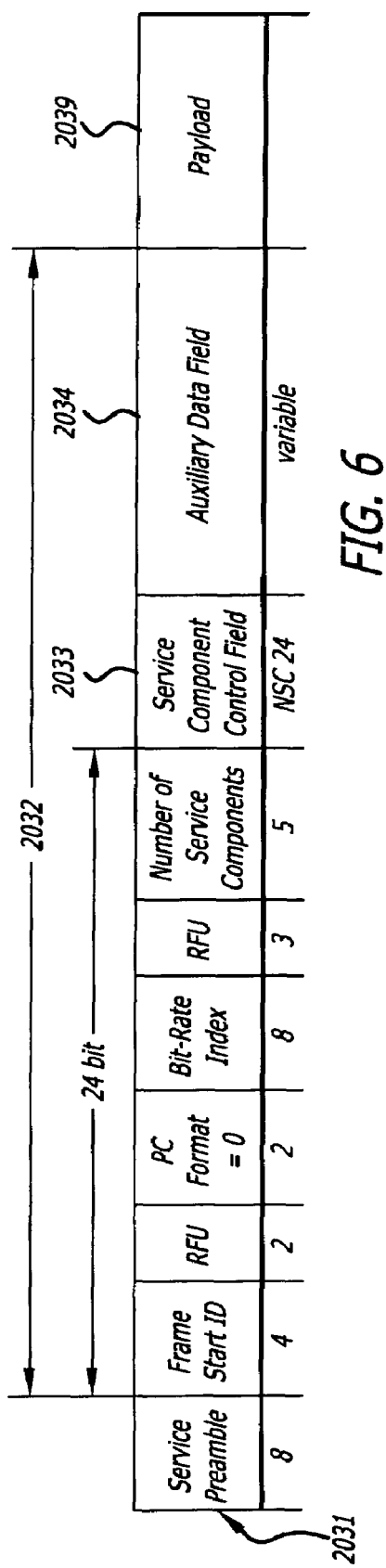
FIG. 6 is a diagram of an illustrative bitstream used by the system for distributing music and data of the present invention.

FIG. 6 is a diagram of an illustrative bitstream used by the system for distributing music and data of the present invention. As shown in FIG. 6, the bitstream 2031 includes a service control header (SCH) 2032 and a payload 2039. In the illustrative XM satellite radio implementation of the present invention, the service control header 2032 includes, inter alia, a service component control field 2033 and an auxiliary data field 2034.

Figure 7:
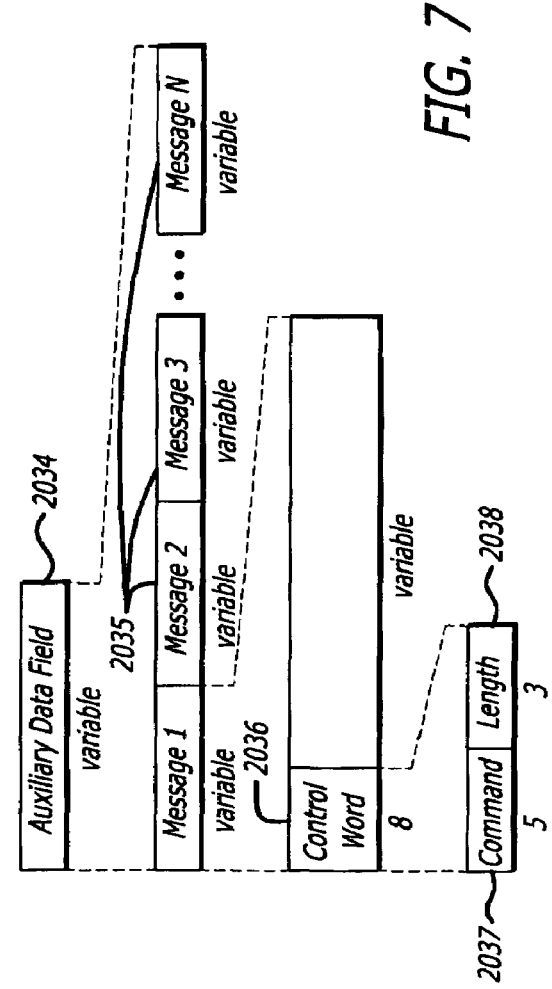
FIG. 7 is a diagram which illustrates the composition of the auxiliary data field of the service control header depicted in FIG. 6.

FIG. 7 is a diagram which illustrates the composition of the auxiliary data field of the service control header depicted in FIG. 6. The auxiliary data field 2034 includes a number of message fields 2035. Each message field 2035 includes a control word 2036 having a 'command' field 2037 and a 'length' field 2038. As illustrated in Table 1, the command field defines the control and content information of the message. The length field defines the number of bytes to follow in the message.

Table 2 is an illustrative command table for use in connection with the system of the present invention. Note that a command of 01000 will be interpreted by the system as a program identification command which assigns a 32-bit program identifier to the active program content of a specific selection ID (SID). In the illustrative embodiment, the least significant bit (byte 1) is used to provide a flag that indicates the record-ability of a given selection.

Byte 2 is used to indicate the current SID. Bytes 3 through six are used to provide 32 bits of program identification. Those skilled in the art will appreciate that the 32-bit program identifier will be effective to allow the system to identify a particular selection which the user desires to record.

Returning to FIG. 5, at step 2040, the bitstream 2031 (FIG. 6) is uplinked from the studio/uplink site 1110 to the satellite 12 (FIG. 3). In the illustrative embodiment, the signal is transmitted via the satellites and terrestrial repeaters in compressed form at 64 kbps by way of example. Although this rate represents a level of quality that is superior to FM, it may not be adequate for music recording for playback on a compact disc. A more appropriate rate for this application would be on the order of 96–128 Kbps. However, this rate would require a large amount of bandwidth for wireless links and minimize the number of channels available. In addition, a large memory would be required at the receiver to record the entire selection. Obviously this is currently regarded as being exceedingly expensive. For example, for a four-minute selection, 30,720,000 bits (30.72 Mbits or 3.84 Mbytes) would need to be stored (four minutes times 60 seconds per minute times 128,000 bits per second). Obviously for high-quality digital recording, this block of bits would have to be error-free and this would be difficult in a mobile environment.

Those skilled in the art will appreciate that the present invention addresses these problems by storing only the song ID (a 32-bit word) instead of the entire selection 30,720,000 bits.

Returning to FIG. 5, at step 2050, this signal is retransmitted to a plurality of receivers 20 as discussed above. At step 2060, each receiver 20 provides an audio output of the program content encoded within the payload field 2039 of the bitstream. Simultaneously, at step 2070, the system checks for activation of a 'user select flag'. If the flag is set, at step 2072, the system checks for activation of the 'record-ability' flag. If either flag is not set, the system continues to output audio at step 2060. If, however, both flags are set, at step 2080, the system records the ID of the current selection and then returns to step 2080 to output audio.

At steps 2090 and 2100, at the user's discretion, the media 1140 is removed from the receiver 20 and inserted into a reader (not shown) provided with or connected to the computer 1150. At step 2110, the computer 1150 is used to access the web site 1170 via an intranet or the World Wide Web 1160 as described above. On the web site, software is provided which reads the selection ID from the media 1140 and translates it into information which may be read by the user. Software running on the appropriate Web page of the web site allows the user to order any selections so identified at step 2120. (Implementation of the web site is well within the level of skill of one of ordinary skill in the web site creation art.) The selections are then delivered to the user electronically via the Internet 1160 or physically by an appropriate delivery mechanism at step 2130 as discussed above.

One of ordinary skill in the art may write a program in a suitable programming language to implement the method illustrated in the flow chart of FIG. 5 without undue experimentation.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for distributing program content comprising:
   first means for transmitting said program content and data relating thereto using a first network, said first means being a satellite digital audio radio service (SDARS) transmitter;
   second means for receiving said program content and data relating thereto, said second means being a satellite digital audio radio service (SDARS) receiver;
   third means for receiving user input while a selection of said program content is being output by said receiver; and
   fourth means for storing data relating to said selection in response to said user input.

2. The invention of claim 1 further including fifth means, responsive to said stored data, for retrieving said program content or information relating thereto from a second network.

3. The invention of claim 1 wherein said fourth means includes a removable electronic storage medium.

4. The invention of claim 3 wherein said removable electronic storage medium is a flash memory card.

5. The invention of claim 2 wherein said second network is the Internet or World Wide Web.

6. The invention of claim 1 wherein said program content includes a plurality of music selections.

7. The invention of claim 6 wherein said second means includes means for playing said music selections as they are received from said first means.

8. The invention of claim 1 wherein said third means includes a voice recognition system.

9. The invention of claim 8 wherein said fifth means includes a kiosk.

10. The invention of claim 1 further including means for selectively disabling said fourth means in response to a nonrecord-ability signal.

11. The invention of claim 1 further including means for selectively displaying information relating to said data.

12. A system comprising:
   a satellite digital audio radio service transmitter for transmitting program content and data relating thereto;
   a satellite digital audio radio service receiver for receiving said program content and data relating thereto;
   means including a voice recognition system for receiving user input;
   a removable electronic storage medium for storing said data in response to said user input; and
   a computer, responsive to said stored data, for retrieving said program content or information relating thereto from the Internet or World Wide Web.

13. The invention of claim 12 wherein said removable electronic storage medium is a flash memory card.

14. A system comprising:
   first means for transmitting program content and data relating thereto using a first network, said first network being a wireless network;
   second means for receiving said program content and data relating thereto;
   third means for receiving user input;
   fourth means for storing said data in response to said user input; and
   fifth means for selectively disabling said fourth means in response to a nonrecord-ability signal.

15. A method for recording data including the steps of:
   transmitting program content and associated data using a first network, said first network being a wireless network including a satellite digital audio radio service transmitter;
   receiving said content and associated data with a satellite digital radio audio service receiver;
   receiving user input while a selection of said program content is being output by said receiver;
   storing a signal identifying said data in response to said user input; and
   retrieving said data from a second network in response to said stored signal.

16. A system for distributing program content comprising:
   first means for transmitting said program content and data relating thereto using a first network;
   second means for receiving said program content and data relating thereto;
   third means for receiving user input while a selection of said program content is being output by said receiver; and
   fourth means for storing data relating to said selection in response to said user input.

* * * * *